Feb. 9, 1971 R. SKINNER 3,561,154
BUBBLE PIPE OR BLOWER
Filed Feb. 23, 1968
FIG. 1
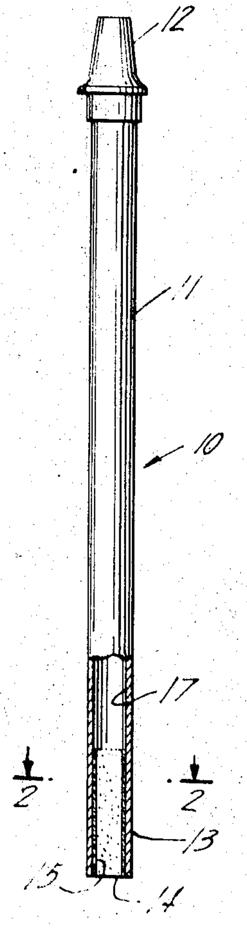
FIG. 2
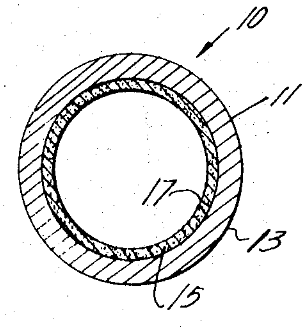
FIG. 5
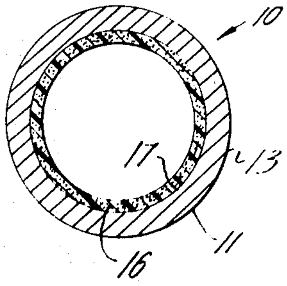
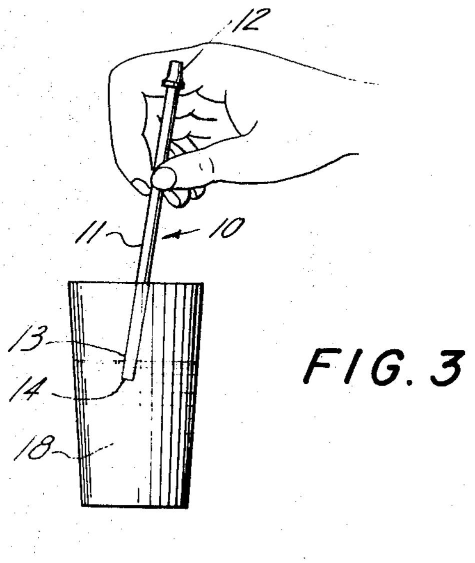
FIG. 3
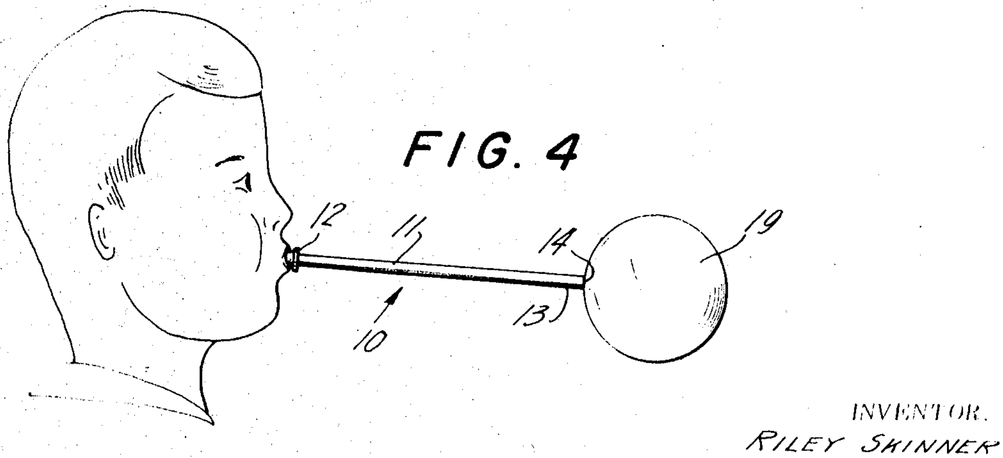
FIG. 4
INVENTOR.
RILEY SKINNER
BY
SPARROW AND SPARROW
ATTORNEYS

United States Patent Office 3,561,154
Patented Feb. 9, 1971

1

3,561,154

BUBBLE PIPE OR BLOWER

Riley Skinner, Paterson, N.J., assignor to Span Products, Inc., Paterson, N.J.

Filed Feb. 23, 1968, Ser. No. 707,609
Int. Cl. A63h *33/28*
U.S. Cl. 46—6 2 Claims

ABSTRACT OF THE DISCLOSURE

A bubble pipe or blower which is provided at its working or forward end portion with a rewettable, concentrated bubble-forming solution or substance in substantially dry form or condition. The internal wall of the blower is impregnated with the concentrated bubble solution, which upon drying and when rewetted with water forms a film suitable for blowing bubbles.

BACKGROUND OF THE INVENTION

This invention relates generally to pipes or tubular members for forming at the forward end thereof and blowing therefrom, bubbles.

Bubble blowing devices per se are known wherein the bubble is formed at the end of a pipe or tube by inserting said end in a soapy solution. This requires that a soapy solution be always on hand. This problem is overcome and solved by the present invention.

SUMMARY

According to the present invention the forward end portion of the bubble blower is provided or impregnated with a concentrated bubble forming solution, which upon drying and when rewetted with water forms a film suitable for blowing bubbles. At least the forward end of the pipe, or tube or cylindrical body of the bubble blower should be absorbent to accept and retain the concentrated bubble solution which later dries and then may be rewet with water for forming the film suitable for blowing bubbles. The tube or cylindrical body may be made of cardboard, pasteboard or other suitable absorbent material or the inner wall of the tube or cylindrical body may be provided particularly at its forward end portion with a sponge, sponge-like or other suitable absorbent liner.

It is a primary object of the present invention to provide a very simple, practical and efficient bubble blower which provides its own bubble making solution when dipped in water.

It is a further object of the present invention to provide a bubble blower which embodies or contains a ready-made dry bubble forming substance or material which when wetted, and the blower then blown into through its mouthpiece, will produce bubbles, the bubble forming material providing for a multiplicity of bubbles being formed upon drying and when rewetted with water.

Yet a further object of the present invention is to provide a bubble blower comprising a substantially tubular body having a mouth-engaging end portion and a forward end portion adapted for dipping into water, the inner wall of said forward end portion being impregnated with a concentrated bubble solution which upon drying and when rewetted with water forms a film suitable for blowing bubbles.

The above and further objects, advantages and features will clearly appear from the detailed description given below taken in connection with the accompanying drawings which form part of this specification and illustrate merely by way of example embodiments of the device of the invention.

BRIEF DESCRIPTION OF THE DRAWING

The constructional features of preferred embodiments

2 of the invention will now be described by way of examples only with particular reference to the accompanying drawings, wherein:

FIG. 1 is a plan view of a preferred embodiment of the bubble blower according to the invention;

FIG. 2 is a detail section of the tip or forward end of the embodiment of FIG. 1 taken through line 2—2 showing the dried bubble-forming solution;

FIG. 3 is a view showing the forward end of the blower dipped in water.

FIG. 4 shows the blowing of a bubble; and

FIG. 5 is a section similar to FIG. 2 depicting the invention in a modified form.

Referring now more specifically to the drawings which depict by way of examples only, certain preferred embodiments of the invention, there is disclosed a bubble blower generally indicated by the reference numeral 10, comprising a tubular or cylindrical body 11 having a substantially tubular stem or mouthpiece 12 and a forward portion 13 provided with an open end or tip 14 opposite mouthpiece 12.

For economy, body 11 may be made of cardboard or pasteboard or any other suitable absorbent material, or the greater portion of body 11 may be made of plastic, metal or other suitable non-absorbent material fitted with a forward end portion comparable to portion 13, made of cardboard, pasteboard or other suitable absorbent material. The mouthpiece 12 may be made of plastic, metal or any other suitable material.

The forward portion 13 of blower 10, is coated or impregnated with a concentrated bubble solution which upon drying and when rewetted with water forms a coating or film suitable for blowing bubbles. The reference numeral 15 indicates the dried bubble solution.

As seen in FIG. 5, the forward portion of longitudinal body 11 may be provided with an absorbent liner made of sponge, sponge-like cellular plastic or other suitable absorbent material 16, applied to the inner wall 17 of the forward part of body 11. Thus, tubular body 11 may be made of any suitable absorbent or non-absorbent material 16 impregnated with the bubble forming solution.

It is understood that the forward portion of the bubble blower may constitute the bowl similar to a conventional pipe or other enlargement, in which case the inner wall of the bowl would be of suitable absorbent material or provided with an absorbent liner. Any suitable concentrated bubble-forming solution may be used as the impregnate which upon drying and when rewetted with water forms a film suitable for blowing bubbles.

To use the bubble blower, the open end 14 of the dipping part of body 11 is dipped into plain water 18. The mouth of the user is then applied to the mouthpiece 12 and air is blown gently through the body 11 into the impregnated bubble solution at the forward portion 13 thereof. Bubbles 19 can thus be formed as long as the bubble solution is kept wet by intermittent dipping of the tip 14 in water.

While the invention has been described and illustrated with respect to certain preferred examples which give satisfactory results, it will be understood by those skilled in the art after understanding the principle of the invention, that various changes and modifications may be made without departing from the spirit and scope of the invention, and it is intended therefore in the appended claims to cover all such changes and modifications.

What is claimed is:

1. A bubble blower comprising a substantially elongated hollow tubular body of substantially uniform external diameter, a mouth-engaging part at one end of said tubular body and a forward part at the other end of said tubular body adapted for dipping into water, said forward part including an absorbent liner, a layer of bubble forming solution in said forward part, and carried by said absorbent liner, said layer adhering to the internal wall of said tubular member along a predetermined length extending longitudinally from said other end of said tubular member, said bubble forming solution consisting substantially of a dry, water soluble matter which when said forward part is dipped into water is capable of forming with said water a bubble when a user blows into said body through said mouth-engaging part.

2. A bubble blower comprising a substantially elongated hollow tubular body of substantially uniform external diameter, a mouth-engaging end portion at one end of said tubular body and a forward end portion at the other end of said tubular body adapted for dipping into a liquid, the inner wall of said forward end portion constituting an absorbent liner which is impregnated with a concentrated bubble solution which upon drying and when rewetted forms a film suitable for blowing bubbles.

References Cited

UNITED STATES PATENTS

| | | | |
|---|---|---|---|
| 1,115,556 | 11/1914 | Little | 46—6 |
| 1,284,440 | 11/1918 | Pierce | 46—6 |
| 2,959,887 | 11/1960 | Remeika | 46—6 |

LOUIS G. MANCENE, Primary Examiner

D. L. WEINHOLD, Jr., Assistant Examiner